(12) United States Patent
Gervais et al.

(10) Patent No.: US 10,762,750 B2
(45) Date of Patent: Sep. 1, 2020

(54) METHOD FOR TRIGGERING ADDITIONAL ACTIONS CARRIED OUT BY AN ELECTRONIC DEVICE COOPERATING WITH A PERIPHERAL

(71) Applicant: ORGANISATION MECANOGRAPHIQUE ET COMPTABLE GERVAIS OMC GERVAIS, Cuers (FR)

(72) Inventors: Philippe Gervais, Cuers (FR); Stéphane Vartanian, Cuers (FR)

(73) Assignee: ORGANISATION MECANOGRAPHIQUE ET COMPTABLE GERVAIS OMS GERVAIS, Cuers (FR)

( * ) Notice: Subject to any disclaimer, the term of this patent is extended or adjusted under 35 U.S.C. 154(b) by 253 days.

(21) Appl. No.: 15/548,937

(22) PCT Filed: May 12, 2017

(86) PCT No.: PCT/FR2017/051152
§ 371 (c)(1),
(2) Date: Aug. 4, 2017

(87) PCT Pub. No.: WO2017/203125
PCT Pub. Date: Nov. 30, 2017

(65) Prior Publication Data
US 2018/0240311 A1 Aug. 23, 2018

(30) Foreign Application Priority Data
May 26, 2016 (FR) ...................... 16 54736

(51) Int. Cl.
| G07G 1/14 | (2006.01) |
|---|---|
| G07G 1/00 | (2006.01) |
| G06Q 20/20 | (2012.01) |
| G06Q 30/02 | (2012.01) |

(52) U.S. Cl.
CPC ............. *G07G 1/14* (2013.01); *G06Q 20/202* (2013.01); *G06Q 30/02* (2013.01); *G06Q 30/0265* (2013.01); *G07G 1/0009* (2013.01)

(58) Field of Classification Search
None
See application file for complete search history.

(56) References Cited

U.S. PATENT DOCUMENTS

| 4,783,752 A | * | 11/1988 | Kaplan | .................... G06N 5/04 |
|---|---|---|---|---|
| | | | | 706/48 |
| 7,106,465 B1 | * | 9/2006 | Simpson | ............. G06F 11/3013 |
| | | | | 358/1.15 |
| 7,344,070 B2 | * | 3/2008 | Nobutani | ................ G06Q 20/20 |
| | | | | 235/383 |
| 2006/0070843 A1 | * | 4/2006 | Zwieg | ..................... G07D 3/00 |
| | | | | 194/346 |

(Continued)

*Primary Examiner* — Allen C Chein
(74) *Attorney, Agent, or Firm* — Buchanan Ingersoll & Rooney PC

(57) ABSTRACT

The invention relates to a method for triggering one or several actions complementary to those triggered by an application method implemented by an electronic device. The invention further relates to a system including one or several electronic devices implementing said method triggering complementary actions to cooperate with one or several communicating electronic peripherals.

9 Claims, 2 Drawing Sheets

(56) References Cited

U.S. PATENT DOCUMENTS

Figure 1:
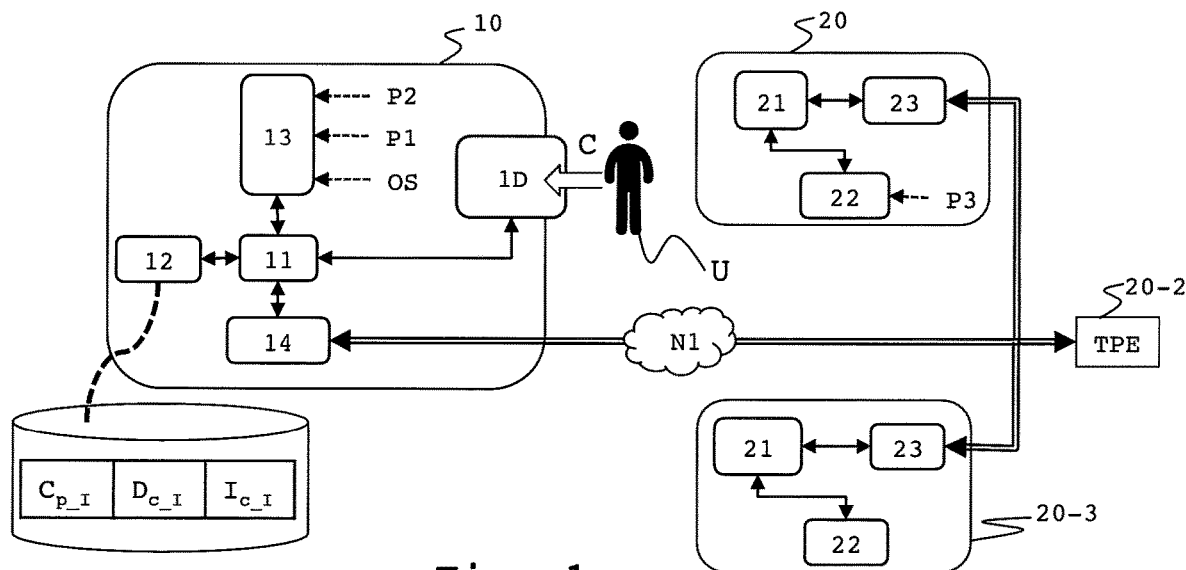

2010/0159996 A1* 6/2010 Rider .................. G06F 3/04886
455/566
2017/0132600 A1* 5/2017 Egan .................... G06Q 20/327

* cited by examiner

METHOD FOR TRIGGERING ADDITIONAL ACTIONS CARRIED OUT BY AN ELECTRONIC DEVICE COOPERATING WITH A PERIPHERAL

The invention relates to a method for triggering one or several actions complementary to those triggered by an application method implemented by an electronic device, one preferred, non-limiting example being a cash register cooperating with one or several peripherals. According to the aforementioned example application, such peripherals may advantageously consist of a change machine or a remote electronic payment server. The invention thus makes it possible to add functionalities to a computer program approved or developed by a third party, for which it is not relevant to request an update from the publisher, in particular as upgrades of the peripherals occur. According to the preferred example application, such a software program is a POS (point-of-sale) program provided to be installed on an electronic device, close to a personal computer, in order to turn the latter into a cash register. More generally, the aim of the invention consists in fine of providing new functionalities or supplanting existing functionalities caused by the implementation of instructions from a computer program, without needing to update said computer program. The invention further relates to a system making it possible to carry out such a method.

In the rest of the document, a "peripheral" or "communicating electronic peripheral" will refer to any hardware and/or electronic entity able to interact with an electronic device implementing a method according to the invention. As one non-limiting example, such a peripheral may consist of a second electronic device similar to a suitable device according to the invention, or a remote electronic platform communicating via a communication network, for example Internet or an intranet.

A computer software package is a set of rules relative to the operation of a set of data processing operations. It is generally made up of one or several computer programs. A computer program in turn consists of a sequence of instructions able to be interpreted and/or executed by a processing unit of the electronic device, which specifies, step by step, operations or processing steps that said processing unit will thus carry out to obtain a result. Said instructions are commonly interpreted or carried out by a processing unit generally comprising one or several processors or microcontrollers in particular. Said instructions are recorded beforehand in a program memory accessible in read mode by said processors or microcontrollers.

An electronic device, the processing unit of which executes such instructions, further includes or cooperates with other electronic elements, for example one or several data memories, man-machine input and output interfaces. The implementation of a computer program by the hardware resources of such an electronic device is sometimes governed by a set of services offered by an operating system, which in turn consists of a computer program whose instructions are installed in one of said memories of said device. Said services make it possible to facilitate access to or exploitation of said hardware resources for any computer application program, the instructions of which are also installed in one of the memories of said device.

Different operating systems exist. Some are standardized, such as Android and Linux, while others, on the contrary, are specific to a particular electronic device or said to be "proprietary," i.e., they correspond to specific specifications. The services offered by the different operating systems are specific to each of them. Thus, to implement a computer program using a specific electronic device, said program must be arranged to cooperate with the operating system that is already installed in the memory of said determined electronic device. It is thus common for a required update for an operating system, for example to cooperate with new resources or peripherals, to require a total or partial new development of a computer program arranged to operate using an earlier version of said operating system. Thus, a new edition of said program is required.

A computer program is therefore limited by its functionalities imposed and developed by its publisher, and by the type of electronic device on which it is intended to be implemented.

As an example preferred, but non-limiting application, the invention will be described through an example application relative to managing the receipts of a takeaway sales establishment, such as a bakery or a pharmacy.

The receipt, which is the result of a transaction between a customer and a takeaway sales establishment, is generally done using a cash register manipulated by an employee of said establishment, for example and non-limitingly, a cashier. A cash register makes it possible to keep a history of each transaction. It generally includes a man-machine input interface such as a physical or digital keyboard, an adding machine, a cash drawer, a display, or more generally, a man-machine output interface, and a printer, in particular to prepare a receipt for a customer. Technological progress is such that today, cash register builders are producing cash registers comparable to computers respectively implementing POS software having many functionalities. As a non-limiting example, such POS software not only makes it possible to trace any receipt, thus ensuring billing of transactions, but also contributes to managing sale and/or purchase inventory and customer orders. The known POS software cooperates with different POS peripherals, such as a cash drawer or an electronic payment terminal. The cooperation between such a POS software program and the available POS peripherals for a cash register has generally been provided and integrated during the development of said software program in the form of specific program instructions.

However, the POS peripherals evolve based on the uses and practices of customers and/or cash register users, and with the growth of payment means or methods. As examples, to increase the security of takeaway sales establishments and reduce the risk of attempted attacks seeking to rob establishments, as well as for hygiene reasons, by relieving staff in an establishment of handling money directly, peripheral builders have developed new POS peripherals called "change machines." Such a change machine allows a cashier of a takeaway sales establishment not to be in direct contact with money from customers. Indeed, during a transaction, the customer himself inserts his coins or banknotes into the change machine. The latter automatically gives the customer change using an appropriate receptacle. A cashier is thus relieved of any contact with the money. The management of the cash register is also simplified. Furthermore, the change machine generally being a secured automaton, it is much more difficult to vandalize than a simple cash drawer.

Payment means are also continuously evolving. It has for example been possible to observe, for several years, the appearance of online payment platforms, including, but not limited to, the "PayPal" operator. Such nonconventional POS peripherals are generally not taken into account when developing a POS software program, in particular if said software program predates the advent of said nonconventional POS peripheral. Cash registers, following from the use of such a software program, may therefore be unable to offer a payment mode that has become popular, at the risk of upsetting customers. To correct this shortcoming, the POS software program must be modified. Indeed, this POS software program must provide and support communication between a new peripheral and said cash register implementing said software program. In the case of a new payment method based on an online payment platform, it is the POS software program that must support the required communication protocol between said cash register and the new POS peripheral, i.e., said online payment platform.

When the interaction terms between a POS peripheral and a cash register have not been provided beforehand during the development of the POS software installed in said register, the latter can carry out program instructions of a third-party software program commonly called a "driver." It is thus possible, like an installation of a new printer cooperating with a personal computer, to allow the cash register to recognize a new POS peripheral and to develop messages or requests intended for the latter. However, the publishers of such drivers do not always develop versions compatible with the services respectively offered by the operating systems implemented by cash registers. To overcome this difficulty, one alternative could consist of developing and inserting the program instructions and settings necessary to implement communication with a new POS peripheral into the POS software program. The drawback of this method lies in the fact that the communication protocols between the different POS peripherals and the cash registers, implementing known POS software programs, are not standardized. The evolution or appearance of a payment method is therefore generally synonymous with changes to the POS software programs installed in the cash registers. These solutions are therefore ultimately generally expensive and greatly limit the choice of peripherals usable by such cash registers. This problem of limited interoperability is also found in application contexts other than collecting financial compensation. It suffices for the electronic devices suitable for implementing a specific, or even approved or certified, software program or application method to be required to provide cooperation with one or several continuously evolving peripherals.

The invention makes it possible to respond, particularly effectively, to all or some of the drawbacks raised by the aforementioned solutions. To that end, the invention proposes a method making it possible to trigger actions complementary to those caused by implementation of an application program installed on an electronic device, but without developing said application program again.

One particularly innovative method is based on and in particular uses content output, for example of graphics, done from said application program via a man-machine output interface such as a screen or other equivalent means, to interpret an input sent by the user via a man-machine input interface, using a pointing device such as a mouse or keyboard. From the content delivered to the user, the method according to the invention can determine the progression, and therefore semantics, to be associated with an input from the user.

The invention also proposes a system comprising an electronic device suitable for implementing such a method triggering complementary actions according to the invention and cooperating with one or several peripherals.

The many advantages contributed by the invention include that a system according to the invention makes it possible to make electronic device, implementing a specific application method, capable of cooperating with a new communicating electronic peripheral, but without modifying the application method or installing a new driver capable of causing malfunctions of said method or the electronic device implementing it. The invention further makes it possible to do away with any addition of extra hardware intended to translate commands for information intended for or coming from such a new peripheral. Thus, a user of such an electronic device is not constrained in terms of choices, during the acquisition of a peripheral, by the compatibility of said peripheral with an application program already installed on said electronic device. The invention makes it possible to offer a simple solution, not requiring any upgrade of the application program, any software and/or hardware upgrade of said peripheral, or any hardware modification of the device implementing said application program. The invention thus makes said application program, and a fortiori the device implementing it, capable of operating virtually any peripheral, even when the exploitation of the latter is not set out during the development of said application program.

Indeed, according to one preferred embodiment of the invention, an electronic device, for example a cash register, is only adapted by loading the instructions of a computer program structurally independent from the application program already installed in the electronic device. The execution of said program instructions causes the implementation of a method triggering complementary actions according to the invention. Said method according to the invention is implemented as a priority by the electronic device, potentially without the user of the device noticing it, so as to use inputs transmitted by a man-machine input interface of said electronic device, in response to an invitation from the application method, to cause the performance of complementary actions, for example the control of a new peripheral, advantageously in light of contextual elements output by a man-machine output interface of said device under the action of said application method. The method triggering additional actions is not intrusive in the application method governed by said application program. The invention further makes it possible to offer an upgradable electronic device, capable of cooperating with a multitude of peripherals, such as, but not limited to, change machines or online payment platforms, without having to update the application software installed on said electronic device or even to associate said electronic device with a complementary apparatus or hardware interface. Unlike what is naturally procured by a driver for an application program, i.e., new methods for controlling a peripheral, once said application program is arranged to itself trigger the implementation of said driver, the invention makes it possible to virtually extend the functions offered by such an application program installed and implemented by an electronic device adapted according to the invention, whereas said application program is not arranged for that purpose. The invention allows a virtual and natural migration, i.e., without development steps, debugging, certification, for any application software developed to provide communication between a peripheral and an electronic device implementing said application program. To that end, it suffices to install, in said electronic device, a program for triggering complementary actions according to the invention, the complementary actions being the result of an interception followed by an interpretation of inputs "addressed" to the application program without the implementation of the latter being altered as a result.

To that end, the invention first relates to a method for triggering complementary actions implemented by a processing unit of an electronic device, the processing unit implementing an application method for executing an action in response to the provision of an input datum by said processing unit. In order to trigger actions complementary to that provided by the application method, said method includes:

- a step for detecting the provision by the processing unit of an input datum;
- a step for searching, in a data memory cooperating with the processing unit, for a record including the value of the input datum;
- if the data memory includes such a record, said method includes:
  - a step for requesting the non-distribution of said input datum to the application method;
  - a step for causing the implementation by the processing unit of a determined complementary action;
  - a step for requesting the distribution of said input datum to the application method.

In order to supplant an action of the application method, the step for requesting the distribution of said input datum to the application method of said method can consist beforehand of developing a new input datum.

According to the invention, the input datum can be developed by a man-machine input interface cooperating with the processing unit, said input datum translating an interaction between a user and said interface.

To allow an output, for example graphic and/or audio, of content perceptible by one of the user's senses, the data memory may include a digital representation of said perceptible content, the output of which by an output interface also cooperating with said processing unit, to said user, has been caused beforehand by the implementation of the application method.

For a fine interpretation of the scope of an interaction of the user via the output interface, the record from the data memory including the value of the input datum can further include the content of contextual data of interest. To determine said nature, said method may include a step prior to the step for requesting the non-distribution of said input datum to the application method, to compare the respective contents of the digital representation of the content output by the output interface and the contextual data of interest, said step for requesting the non-distribution only being carried out if said step for comparing said contents of said digital representation and said contextual data of interest attests that the latter are similar.

According to the invention, to be able to implement one or several complementary actions, the electronic device may further include a program memory cooperating with the processing unit, said program memory including program instructions dedicated to one or several complementary actions. In order to identify the program instructions associated with a determined complementary action and to trigger the performance or interpretation thereof by the processing unit, the step for causing the implementation of such a determined complementary action may consist of:

- extracting, from the record including the value of the input datum, a complementary action identifier designating the program instructions dedicated to said determined complementary action within the program memory;
- triggering the execution of said program instructions by the processing unit.

In order to communicate with a peripheral, the electronic device may further include communication means providing a determined mode of communication through a communication network, said communication means cooperating with said processing unit. To control said peripheral, the invention may provide a step for causing the implementation by the processing unit of a determined complementary action, which may consist of:

- developing a control request of said peripheral;
- triggering the transmission of said control request via the communication means to the peripheral, said request including control data.

In order to know the operating status of the peripheral, the step for causing the implementation by the processing unit of a determined complementary action may consist of:

- receiving, via the communication means, a status message transmitted by the peripheral, said status message comprising the status data content characterizing the current operating state of said peripheral;
- decoding said status message and extracting the content of said status data therefrom;
- triggering the output of all or part of said status data by the man-machine output interface of the electronic device.

According to a new object, the invention relates to a computer program product including program instructions which, when recorded beforehand in a program memory of an electronic device further including said program memory, a processing unit, a data memory, a man-machine output and input interface, and communication means providing a determined mode of communication, said memories, said interface and said communication means cooperating with said processing unit, cause the implementation of a method triggering complementary actions, according to the invention.

According to a third object, the invention provides an electronic device including a processing unit, a data memory, a program memory, a man-machine output and input interface, and communication means providing a determined mode of communication, said memories, said interface and said communication means cooperating with said processing unit, said electronic device includes, in the program memory, the instructions of a computer program product according to the invention.

According to a fourth object, the invention provides a system including at least one electronic device according to the invention cooperating with at least one peripheral.

Figure 4:
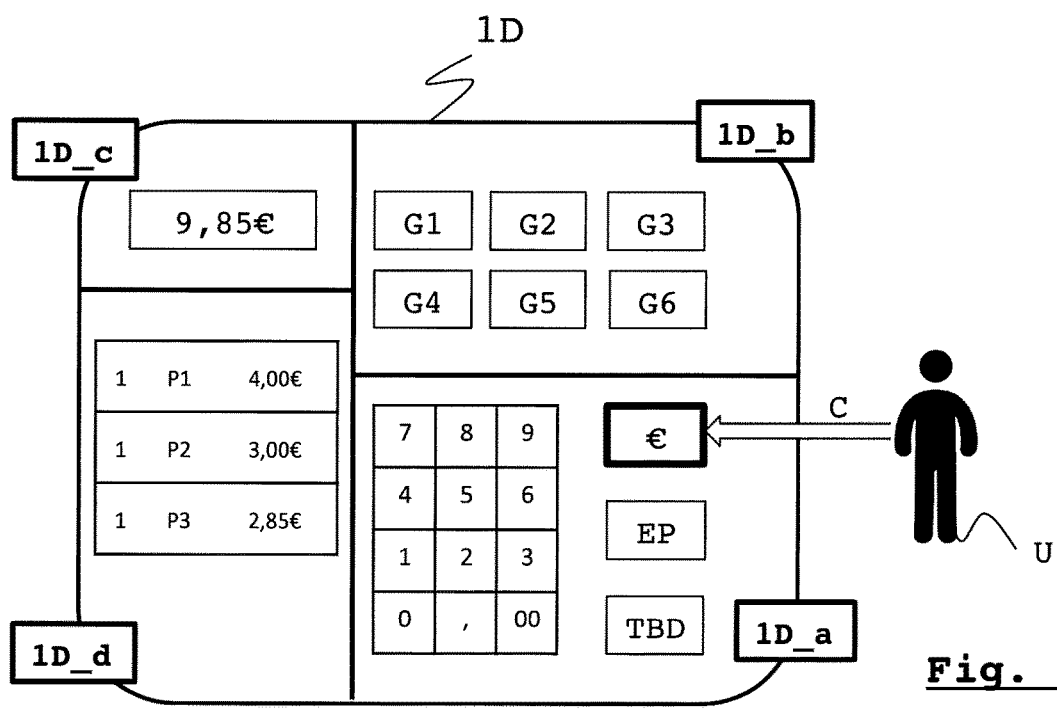
Figure 2:
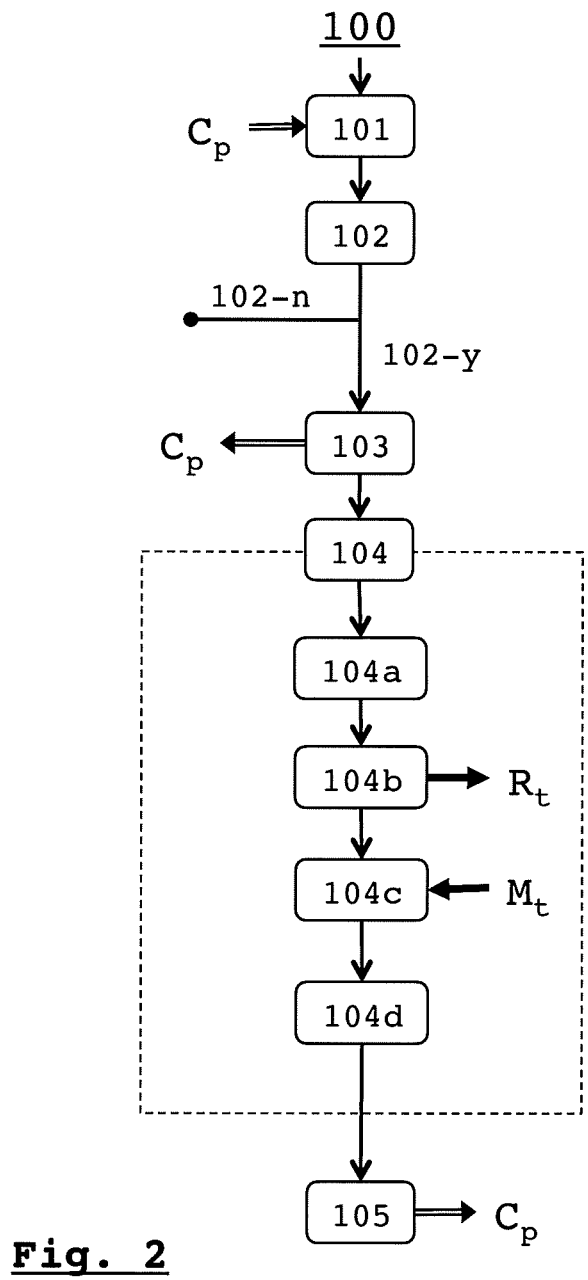
Figure 3:
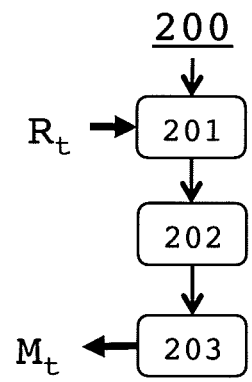

Other features and advantages will appear more clearly upon reading the following description related to one example embodiment provided for information and non-limitingly, and upon examining the figures that accompany it, among which:

FIG. 1 shows a preferred application system according to the invention for carrying out a receipt by an electronic device from a POS peripheral;

FIG. 2 describes one preferred embodiment of a method triggering complementary actions according to the invention;

FIG. 3 describes one preferred embodiment of a communication method between an electronic device according to the invention and a peripheral;

FIG. 4 shows an example of "contextual" content output on a man-machine output interface of an electronic device and exploited by a method triggering complementary actions according to the invention.

FIG. 1 makes it possible to show one example POS system according to the invention. Such a system consists of an electronic device 10 cooperating with one or several local or remote peripherals 20, 20-2, 20-3 communicating with the electronic device 10 via a wired or wireless communication link N1. Such an electronic device 10 may include electronic and/or computer means 11 able to implement an application method A by interpreting and/or executing program instructions of a first computer program product P1, called "application program," installed in a program memory 13. Such means 11 can consist of a processing unit comprising one or several microprocessors or microcontrollers cooperating with said program memory 13. Optionally, to implement the application method A, the notion of "processing unit" may extend, according to the invention, beyond only said electronic components, potentially to an operating system OS also installed in the program memory 13 and implemented by said microprocessors and/or microcontrollers. Said operating system makes it possible to offer services facilitating the management of the hardware resources, to any computer program product implemented by said processing unit 11. Non-limiting examples include the Windows, Linux or OS X operating systems. As a preferred and non-limiting example, the electronic device 10 according to FIG. 1 may consist of a cash register 10 comparable to a suitable personal computer, owing to the installation of an application program in the program memory 13 causing the implementation of a POS application method A. Advantageously, such a device 10 may be directly connected to an electric grid or have a battery to deliver sufficient electricity required for its operation. A communicating electronic peripheral 20, 20-2, 20-3 may in turn for example consist of a change machine 20, an electronic payment terminal 20-2 (EPT), or any other POS peripheral 20-3.

In order to limit maintenance interventions for such a POS system, for example when upgrading or replacing the change machine 20 or installing a new POS peripheral 20-3, for example, but not limited to, an online payment platform, the invention provides for adapting the electronic device 10 of said system so that it carries out a method triggering complementary actions 100, the steps of which will be described later in connection with FIG. 2. The implementation of such a method by the processing unit 11 can be caused during the execution or interpretation of program instructions from a second computer program product P2 that are stored in the program memory 13 of the electronic device 10. Said instructions from said second computer program product P2 cannot, as a non-limiting example, be arranged to cause the implementation of a communication between the electronic device 10 and the peripherals 20, 20-2 and 20-3 depending on the POS mode selected by the user U of the device.

An electronic device 10 according to the invention thus includes the program memory 13 and a data memory 12, cooperating, by coupling and/or by wired buses shown by double arrows in FIG. 1, with a processing unit 11. Said data 12 and program 13 memories may optionally constitute a single and same physical entity.

An electronic device 10 further advantageously includes a man-machine input and output interface 10 cooperating with the processing unit 11. Said interface 10 allows a user U of the electronic device 10 to interact therewith. Such an input and output interface 10 can for example consist of a touchscreen or assume the form of any other means allowing a user U to interact with said electronic device 10. A user U can then instruct said input device 10 to proceed, as a non-limiting example, with a payment by bank card or cash. Alternatively, the electronic device 10 may include two separate man-machine interfaces to translate inputs from a user and to output graphic and/or audio content for said user. Such an input interface may consist of a keyboard, a microphone, a mouse or any other pointing device. Such an output interface may in turn consist of a screen or speaker, such that the user can see or hear, and thus perceive, digital content using one of his senses.

Among different types of graphic and/or audio elements or content, said interface 10 makes it possible to output data that we will qualify as "contextual data." Such contextual data is produced by the processing unit 11 of the device 10 and output by the output interface 10 during the implementation of the POS method. As a non-limiting example, said POS method may include a step for causing a graphic and/or audio output of contextual data, such as display and/or audio questioning elements, inviting the user U to interact with said device 10. This contextual data makes it possible to determine the operating stage of the POS method or the current step thereof being implemented during the output of said contextual data. As we will see later, the invention may advantageously take advantage of said contextual data output on the output and input interface 10 to interpret or impart unambiguous semantics to an input coming from said interface 1D.

Such contextual data output on the man-machine output interface 1D can, by way of examples, correspond to an input icon or to any other information able to be interpreted by a user U, like that illustrated in connection with FIG. 4. According to this non-limiting example, such a output interface 1D retrieves graphic content elements in the form of input icons 1D_a making it possible to select a payment method or to enter the sales price of an item. Such icons may for example depict and/or symbolize a keypad and/or payment means, for example a cash payment represented by the symbol "€," an electronic payment means represented by the abbreviation "EP," or any other payment means represented by the acronym "TBD." Other graphic elements 1D_b can make it possible to depict items G1, G2, etc. An icon G1 can, as a non-limiting example, describe a pictogram or a word characterizing a specific item. For example, such a word may be the word "baguette" in French. Such an output interface 1D may furthermore deliver output icons 1D_c and 1D_d respectively representing an amount remaining due relative to the financial transaction and a list of items accounted for in the form of a detailed quotation.

The contextual data output by the output interface 1D can be stored beforehand in a volatile output memory dedicated to the graphic or audio output of said data, said output memory cooperating with the processing unit 11 or being internal to the latter. It is thus possible to address the processing unit 11 in order to access said output memory in read-only mode. Alternatively, it is possible to command said processing unit 11 to carry out a capture of all or part of the output content and inscribe a digital representation thereof in said output memory. The latter may further be dissociated from or optionally combined with the data memory 12.

Furthermore, the interaction between a user U and the man-machine input and output interface 1D is translated into an input datum $C_p$ by said interface 1D. According to the example embodiment in connection with FIGS. 1 and 4, such an input datum $C_p$ is sent to the processing unit 11. The latter may advantageously offer a subscription service to the various methods that it carries out. Such a subscription service makes it possible to provide said input datum $C_p$ for all methods previously subscribed for regarding said service. Such a subscription method may then "appropriate" said datum $C_p$. Within the meaning of the invention and throughout the entire document, the term "appropriate" refers to an action consisting of requesting a non-distribution of said input $C_p$ to the other methods subscribed for by the processing unit 11. Such a non-distribution request may consist of requesting a determined service made available by said processing unit 11. If no subscribed method wishes to appropriate an input datum $C_p$, the processing unit 11 makes it available to the method having caused the output of contextual data having elicited the interaction with the user U from which the input datum $C_p$ results. According to one alternative, a method, having previously appropriated an input datum $C_p$, can authorize the processing unit 11 to provide other methods with such an input datum $C_p$, by requesting an appropriate service for distribution of said input datum $C_p$ from the processing unit 11. Such a distribution request may consist of another determined service made available by the processing unit 11. Such an input datum $C_p$ is then transmitted to the method having caused the output of the contextual data having elicited the interaction with the user U of the device 10 translated by the input interface 1D into the input datum $C_p$. In the case at hand, said datum $C_p$ is available for the POS method.

The input data $C_p$ can thus follow from interactions between the input and output interface 1D and a user U. Such an interaction can follow from a voice command transmitted by said user U via a microphone. According to one alternative, such an interaction may consist of selecting a predetermined pointing location or range, for example describing a virtual key, that the user U can select via the input interface 1D. As a non-limiting example, said user U can hover, for example with his finger or using an appropriate pointing device, over different pointing ranges, then select a virtual key corresponding to a particular POS mode. As indicated by FIG. 4, such a virtual key may, for example, symbolize a cash receipt by the presence of a "€" symbol. An input datum $C_p$, related to pointing by the user via an interface 1D in the form of a touchscreen, advantageously includes a pair of integer values designating a pixel of said screen translating the location of the selection point on the man-machining input interface 1D. Optionally, such an input datum $C_p$ may further include one or several attributes translating, as a non-limiting example, a particular type of selection, such as the actuation of the right or left key of a pointing device of the computer mouse type.

In order to be able to cooperate with a peripheral, like the change machine 20 described in connection with FIG. 1, an electronic device 10, for example a cash register, also includes communication means 14, in the form of a modulator-demodulator, allowing said electronic device 10 to communicate through a communication network N1, for example a wireless connection based on a proximity protocol of the Wi-Fi or Bluetooth type. The communication means 14 may further or alternatively advantageously consist of a USB (Universal Serial Bus) port, in order to implement a wired connection N1.

Like an electronic device 10 according to the invention, a peripheral 20, 20-2 or 20-3, hereinafter referenced 20 for simplification reasons, advantageously includes a processing unit 21, for example in the form of one or several microcontrollers or processors, cooperating with storage means 22, in the form of a data memory and optionally a program memory, said memories being able to be separated or optionally to form a single and same physical entity. Such a peripheral 20 also includes at least one communication means 23, in the form of a modulator-demodulator, making it possible to communicate with the electronic device 10. The means 23 may then advantageously consist of a USB (Universal Serial Bus) port, or any other means supporting a proximity communication protocol, for example of the Bluetooth or Wi-Fi type. The storage means 22 and the communication means 23 advantageously cooperate with the processing unit 21 by one or several communication buses, shown in FIG. 1 by double arrows. The program memory 22 of said peripheral 20 records the program instructions of a third computer program product P3, implementing processing operations or actions specific to said peripheral 20, during the interpretation and/or execution of said instructions by the processing unit 21. Such an interpretation and/or execution may, as a non-limiting example, trigger the application of a method, for example a payment method.

As previously mentioned, to contribute new functionalities, supplant existing functionalities of an application method A, or even to adapt a cash register 10 implementing a POS method based on a new change machine 20 requiring a different operating mode and/or communication mode from a previous change machine, the invention provides for saving instructions for a second computer program product P2 in the program memory 13 of the communicating electronic device 10. Said instructions of program P2 have previously been arranged, during a prior development and/or publishing phase of the program P2, to cause the limitation of the method triggering complementary actions, advantageously in light of contextual elements output by the man-machine output interface 1D of said device 10, during the implementation of the application method A by the processing unit 11. An example implementation of a method 100 triggering complementary actions is described in connection with FIG. 2.

In order to implement such a method 100, the data memory 12 of the device 10 as described in connection with FIG. 1 may include, as a non-limiting example, an inputs of interest table arranged to save one or several records respectively dedicated to one or several inputs of interest. Each record is arranged to store an inputs of interest repository $C_{p\_1}$ and an action repository $I_{c\_1}$ designating one or several complementary actions to be triggered if a setpoint $C_p$ corresponds to said inputs of interest repository $C_{p\_1}$. An inputs of interest repository $C_{p\_1}$ may include a value, for example, but not limited to, a computer code designating a key of a keyboard or a range of values designating a selection zone for example defining the surface of a virtual key output by the output interface 1D, or even a spectrum translating one or several reference sounds. A value range designating a selection surface may then be characterized by pairs of coordinates defining a rectangle, a triplet designating the center and radius of a disc, or any characteristic characterizing another geometric shape including a virtual key. Said input of interest repository $C_{p\_1}$ may further include complementary attributes for example characterizing a determined key, right or left, if the pointing device used is a computer mouse.

An actions repository $I_{c\_1}$ may include a field dedicated to a complementary actions identifier designating, for example in the program memory 13, program instructions dedicated to one or several complementary processing operations or actions defined during a prior configuration or setting step of the device 10. Alternatively, such program instructions may be recorded in the data memory 12.

When the man-machine output and input interface 1D consists of a touchscreen, an application method A may then output several different graphic contents, for example a first screen page relative to the receipt of the transaction and a second screen page relative to order tracking or inventory management. Depending on the output screen page, an input datum $C_p$, including a pair of coordinates, must then be interpreted to cause the implementation of the determined action or processing operation from among two different actions or processing operations. A record dedicated to an input of interest must then include an additional field including the content of contextual data of interest $D_{c\_1}$ characterizing content specific to a determined screen page. As a non-limiting example, such contextual data of interest $D_{c\_1}$ can be a digital representation of a predefined graphic or audio contextual content able to be output by the output interface 1D. Such contextual data of interest $D_{c\_1}$ can further designate a particular location within a content associated with said digital representation upon its output by the output interface 1D.

FIG. 2 describes a functional diagram according to the invention of a method 100 for triggering complementary actions.

To illustrate the contribution of the invention, let us study an example application according to which a user U of a cash register 10 according to the invention wishes to perform a financial transaction in cash. Such a user U may for example be a cashier.

The man-machine output and input interface 1D of said cash register 10 is optionally made up of a touchscreen. The processing unit 11 of the cash register 10 implements a POS method A in particular including a step for retrieving graphic content. Such graphic content may for example consist of a screen page relative to the receipt of the financial transaction as shown in connection with FIG. 4. The cash register 10 cooperates with a peripheral such as, by way of non-limiting example, a change machine 20. The establishment of cooperation between said change machine 20 and the cash register 10 takes place after initializing the POS method A, i.e., the communication between said change machine 20 and said cash register 10 is not supported by said method A. So as not to update the POS method A, the processing unit 11 of the cash register 10 implements a method 100 triggering complementary actions, said method 100 thus acting as a "computer portal," gateway or driver between said cash register 10 and said change machine 20.

In order to instruct the cash register 10 to perform a cash receipt, a user U selects, on the input interface 1D of the cash register 10, an input icon representing a cash payment, represented by the symbol "€" in connection with FIG. 4. Such a selection may follow from the location of a finger of the user U on said input icon. The man-machine input interface 1D then determines the location of said icon and translates this location into an input datum $C_p$, as a non-limiting example, in spatial coordinates. Such a determination may for example follow from the detection of the change of electric potential on the touchscreen 1D of the cash register 10 or the interruption of infrared beams for screens 1D using an infrared determination method. The interface 1D provides the processing unit 11 of the cash register 10 with said input datum $C_p$.

In one preferred but non-limiting example of the invention, the data memory 12 of the cash register 10 includes a table of records respectively dedicated to inputs of interest that we will call "inputs of interest table" for simplification purposes. Such a table may be saved in the form of a database or a table in the data memory 12. Said table may have been configured beforehand and initialized during the implementation of a configuration method 300 described later. Thus, a record of such a table may include a first field dedicated to an inputs of interest repository $C_{p\_1}$, a second field dedicated to an action repository $I_{c\_1}$, a third optional field dedicated to contextual data of interest $D_{c\_1}$. As a non-limiting example, said first field $C_{p\_1}$ includes a pixel selection range characterizing the surface of a determined input icon, for example that including the symbol "€" in connection with FIG. 4. The second field may include a complementary action identifier designating program instructions dedicated to a determined complementary processing operation, as non-limiting examples, program instructions whereof the execution or interpretation by the processing unit 11 causes the implementation of a communication between the change machine 20 and the cash register 10. The third field may include the contextual data content, such as, by way of non-limiting example, a digital representation of the graphic output of the input icon representing a cash payment means and data characterizing the location of the icon on the screen page where said icon is presumed to be graphically output by the output interface 1D. Such a graphic representation may consist of a table of pixels including a shade of gray for each of them, associated with a pair of spatial coordinate for example characterizing the location of the center of the input icon on the interface 1D during the output of the associated screen page.

The program memory 13 may include a database or table including program instructions dedicated to one or several complementary processing operations defined beforehand during the implementation of a configuration method 300 described later. Such program instructions may, when executed or interpreted by the processing unit 11 of the cash register 10, implement a payment method by change machine.

In connection with FIG. 2, a method 100 according to the invention and implemented by the processing unit 11 of said cash register 10 described in connection with FIG. 1 includes a first step 101 for detecting a provision by the processing unit 11 of an input datum $C_p$.

The method 100 then includes a step 102 for looking, in the inputs of interest table recorded in the data memory 12, for a record including the value of the input datum $C_p$. This step 102 may thus consist of performing a test to determine whether the content of the extracted input datum $C_p$ is included in one of the data ranges of the inputs of interest repositories $C_{p\_1}$ respectively predetermined within records in the inputs of interest table. The test may be done using known functions and/or computer operators.

According to a first situation, in step 102 attests that no record includes the content of the input datum $C_p$, situation symbolized by link 102-$n$ in connection with FIG. 2, the implementation of the method 100 ends.

According to a second situation, if step 102 attests that an input of interest repository $C_{p\_1}$ of a record includes the content of the input datum $C_p$, situation symbolized by link 102-$y$ in connection with FIG. 2, the method 100 includes a step 103 for requesting a non-distribution of the input datum $C_p$ to the POS method A as well as any other concomitant complementary method implemented by the processing unit 11. Such a request may consist of requesting a specific service from the processing unit 11, as previously described. This recourse may be compared to the taking over of control of the cash register 10 by the method 100 without the POS method A "knowing." To avoid any new input coming from the user U, the invention may provide that step 102 further consists of developing a graphic and/or audio content and triggering the output thereof by the man-machine output interface 1D. By way of non-limiting example, such content may consist of superimposing a gray web over the current screen page, concealing virtual icons or keys. Thus, the user U is not encouraged to solicit the interface 1D as long as said web remains visible by said user.

According to one alternative of the invention, step 102 for looking in the inputs of interest table of the data memory 12 for a record including the value of the input datum $C_p$ may further consist of determining the current implementing context of the application method A to determine from the latter whether the input $C_p$ must be considered an input of interest or, on the contrary, must be ignored even though a record includes the content of said input. Indeed, as we saw previously, the POS method A may output several different graphic contents, such as a first screen page relative to the collection of the transaction and a second screen page relative to order tracking or inventory management. In order to determine the complementary action to be taken following interaction by the user U on the output and input interface 1D, step 102 may further consist of determining and analyzing all or part of the content output by the man-machine input interface 1D during said interaction with the user U, to deduce the current implementing context of the method A therefrom. In this way, the method 100 is not invasive in light of the application method A.

Such a step may consist of looking, in the output memory, for all or some of the digital representations of the elements, output by the interface 1 and which we will qualify as contextual, characteristic of the current implementing context of the application method A. As an example, such a characteristic element may consist of the input icon $1_{D\_a}$ whereof the digital representation is recorded in the output memory. Step 102 then consists of comparing said contextual element output by the output interface 1D with the contextual data of interest $D_{c\_1}$ associated with the record including the input datum $C_p$. To that end and by way of non-limiting example, the processing unit 11 can perform optical character recognition (OCR) to discriminate a chain of characters and/or an alphanumeric character contained in said contextual elements and compare it to the contextual datum of interest $D_{c\_1}$. According to one alternative, the processing unit 11 can determine a dissimilarity level or a distance between two digital representations, respectively that graphically output by the interface 1D and that contained in the record as contextual datum of interest $D_{c\_1}$. All other methods making it possible to determine a dissimilarity level between two digital representations may alternatively be used.

According to a first situation, symbolized in FIG. 4 by link 102-$n$, if the processing unit 11 attests to a high dissimilarity level, i.e., the two digital representations are not similar or identical, the implementation of the method 100 ends.

According to a second situation symbolized by the link 102-$y$, if step 102 attests to a low dissimilarity level, i.e., the two digital representations are considered to be similar or identical, then the method 100 implements a step 103 for requesting a non-distribution of the input datum $C_p$ to the POS method A, as previously described.

At the end of the implementation of step 103, the method 100 includes a step 104 for triggering the implementation by the processing unit 11 of the determined complementary action. Such a step may consist of extracting the associated complementary action identifier from the record including the content of the input datum $C_p$, then searching 104$a$ in the program memory 13 for the program instructions designated by said complementary action identifier. According to our example application, such instructions, when they are executed or interpreted by the processing unit 11, may non-limitingly implement a complementary POS action by change machine. According to a first embodiment, such a complementary action may include a step for determining the amount of the transaction to be collected. According to this first mode, the output memory may include a data structure including the digital value of said amount, the latter having previously been recorded during the implementation of a step of the POS method A. The processing unit 11 can then access said output memory in read-only mode and extract said amount directly.

In another alternative according to the invention, the processing unit 11 can determine the amount of the transaction to be collected, for example €9.85 according to the example described in connection with FIG. 4, from the graphic output of the amount remaining due 1D_c output by the man-machine output interface 1D, during the implementation of the POS method A. Step 104 thus consists of searching, in the output memory, for the digital representation of said amount, then extracting the latter from said digital representation. The processing unit 11 then performs, as a non-limiting example, optical character recognition (OCR) to determine the amount of the transaction to be collected. The location of said representation has been previously determined and configured during the implementation of a configuration method 300 described later. According to one alternative, the processing unit 11 can determine a dissimilarity level between two digital representations, respectively that graphically output by the interface 1D and that contained in a database or table recording a digital representation of reference symbols or images, able to be output in the output element 1D_c representing the amount remaining due relative to the transaction, said database or table being stored in the data memory 12. Such symbols may consist, as non-limiting examples, of Arabic numerals "1," "2," . . . , "9" and any punctuation mark making it possible to mark a separation between the tens and hundreds, for example, "," or "." The processing unit 11 may then compare the digital representation of the reference signals to the digital representation of the output element 1D_c, and determine a dissimilarity level between each image. Any other method making it possible to determine the similarity level between two images can alternatively be used.

Once the amount of the transaction to be collected is determined, the complementary action, implementation of which has been caused by the payment method 100 by change machine, may include a step 104$b$ for developing a control request $R_t$ of the change machine 20. Said request $R_t$ may include the content of the control data $I_c$ necessary to implement the payment method via the change machine 20. The control data $I_c$ advantageously include said amount of the transaction previously determined, or even a cash register identifier 10. The processing unit 11 then automatically triggers the transmission of said control request $R_t$ by the communication means 14 from the cash register 10 to the change machine 20.

The change machine 20 can in turn implement a method 200 for communicating with the cash register 10 shown in FIG. 3. Such a method 200 may include a step 201 for receiving and decoding the control request $R_t$. A subsequent step 202 may consist of extracting the amount of the transaction to be collected from said request, then triggering the implementation of the payment method by the processing unit 21 of said change machine 20.

According to one alternative of the invention, the communication method 200 with the cash register 10 may include a step 203 for developing and triggering the transmission of one or several status messages $M_t$ to the cash register 10. Such a status message $M_t$ may include status data $D_e$ characterizing, by way of non-limiting example, a current operating state of said change machine 20, characterizing a transaction payment, the level of coins in the change machine 20, etc.

The method 100 may then include a subsequent step 104c for receiving said status message $M_t$ via the communication means 14, decoding said status message $M_t$ and extracting the content of said status data $D_e$ therefrom. The method 100 may further include a step 104d for triggering the output of all or part of the status data $D_e$ previously extracted by the man-machine output interface 1D, in order to inform the user U of the device of the progression of the processing implemented by the change machine 20.

Once the complementary action, implemented in step 104 of the method 100, is completed, the method 100 advantageously includes a step 105 for requesting the distribution of the input datum $C_p$ to the POS method A during a step 105. Everything then happens as if the method 100 triggering complementary actions had never requested the non-distribution of said second datum $C_p$. The POS method A then executes an action associated with said input $C_p$ normally, if such an input is deemed of interest by said application method A.

According to one alternative of the invention, a method 100 triggering complementary actions may include a step not shown in FIG. 2, for developing and including a new input datum $C_p$ before requesting the distribution of said input datum $C_p$ in step 105. Such an alternative thus allows the method 100 to alter the content of the input $C_p$, for example following a detected operating error of the peripheral 20. Thus, while a POS input has been transmitted to the interface 1D, the latter can translate to a cancellation input or quite simply an absence of inputs for the application method A.

Before any implementation of the method 100 triggering complementary actions, the invention provides a configuration method 300, the purpose of which consists of determining the inputs of interest, or even contextual data of interest, and associating said inputs of interest with one or several complementary actions. Such a method 300 may thus consist of initializing the inputs of interest table in the data memory 12 and/or in the program memory 13. As a non-limiting example, a method 300 may further include a first step for recording a complementary action identifier in the field dedicated to the action repository of each record of the inputs of interest table of the data memory 12. Said method 300 may then include a second step for capturing the digital representation of a particular location of the screen page output by the man-machine output and input interface 1D, for example the location of an input icon symbolizing a cash receipt on the screen page relative to the collection of the transaction. Said method 300 may include a third step for recording a value range corresponding to the location of said icon in the inputs of interest repository $C_{p\_1}$ associated with the record dedicated to a cash payment input, and recording the digital representation of said entry in the field dedicated to the contextual data $D_{c\_1}$ of said record.

Furthermore, such a method 300 may make it possible to initialize the operation of the processing unit 11. Such an initialization may consist of loading, within the program memory 13, the instructions of the program P2 which, when they are executed or interpreted by said processing unit 11, trigger the implementation of a method 100 triggering additional actions according to the invention.

According to one alternative of the invention, a system according to the invention may include one or several electronic devices 10 cooperating with one or several peripherals 20, 20-2, 20-3. Each device 10 and each peripheral 20 then includes a respective identifier specific to it. Said identifiers are then integrated into the control messages $R_t$ coming from the electronic devices 10 and the status messages $M_t$ coming from the peripherals 20, 20-2, 20-3 and transmitted within the communication network N1, to make it possible to identify the senders and recipients of said messages $M_t$ and requests $R_t$.

Each replacement, addition or update of a peripheral 20, 20-2, 20-3 is only subject to an update of the method 100 triggering complementary actions, for example by loading program instructions P2 modified accordingly into the program memory 13. The application method A and the method implemented by said peripheral 20 remain unchanged.

The invention has been described preferably in connection with a cash register. The invention could, however, be used in any other application requiring updating or supplanting predefined actions of an application method A. By way of non-limiting example, the invention could be used in connection with a manager for connected objects in a house, implementing an application method A for managing these objects. As a non-limiting example, the method 100 triggering complementary actions according to the invention could make respectively new connected objects interoperable, through the output interface 10 of said manager and the content output by said interface 1D during the implementation of the management method, making it possible, as a non-limiting example, to contact the police in case of danger.

The invention claimed is:

1. A method for triggering complementary actions implemented by a processing unit of an electronic device, the electronic device being connected to a cashing peripheral, said method triggering complementary actions comprising:
   a step for detecting reception by the processing unit of an input datum;
   a step for searching, in a data memory cooperating with the processing unit, for a record including a value of the input datum;
   a step of determining whether the data memory includes such a record;
   a step, in response to a determination that the data memory includes such a record, requesting non-distribution of said input datum to an application method of cashing registration for executing an action in response to provision of the input datum, the application method being implemented by the processing unit, and not supporting the cashing peripheral;
   a step for causing implementation by the processing unit of a determined complementary action, said determined complementary action including the sending of a command to the cashing peripheral; and
   a step for requesting distribution of said input datum to the application method after execution of the command by the cashing peripheral.

2. The method according to claim 1, wherein the step for requesting the distribution of said input datum to the application method comprises beforehand of developing a new input datum.

3. The method according to claim 1, wherein the input datum is developed by a man-machine input interface cooperating with the processing unit, said input datum translating an interaction between a user and said interface.

4. The method according to claim 3, wherein:
   the data memory includes a digital representation of content perceptible by a user, the output of which by an output interface, also cooperating with said processing unit, to said user has been caused beforehand by the implementation of the application method;

the record from the data memory including the value of the input datum further comprises the content of a contextual datum of interest;

said method including a step, prior to the step for requesting the non-distribution of said input datum to the application method, to compare the respective contents of the digital representation of the content output by the output interface and the contextual data of interest, said step for requesting the non-distribution only being carried out if said step for comparing said contents of said digital representation and said contextual data of interest attests that the latter are similar.

5. The method according to claim 1, wherein:

the electronic device further includes a program memory cooperating with the processing unit, the program memory includes program instructions dedicated to one or several complementary actions;

the step for causing the implementation by the processing unit of a determined complementary action comprises:
extracting, from the record including the value of the input datum ($C_p$), a complementary action identifier designating the program instructions dedicated to said determined complementary action within the program memory;
triggering the execution of said program instructions by the processing unit.

6. The method according to claim 1, wherein:

the electronic device further includes communication means providing a determined mode of communication through a communication network to cooperate with a peripheral, said communication means cooperating with said processing unit;

the step for causing the implementation by the processing unit of a determined complementary action comprises:
developing a control request of said peripheral;
triggering the transmission of said control request via the communication means to the peripheral, said request including control data ($I_c$).

7. The method according to claim 6, wherein the step for causing the implementation by the processing unit of a determined complementary action further comprises:

receiving, via the communication means, a status message transmitted by the peripheral, said status message comprising the status data content characterizing the current operating state of said peripheral;

decoding said status message and extracting the content of said status data therefrom;

triggering the output of all or part of said status data by the man-machine output interface of the electronic device.

8. A non-transitory computer-readable medium encoded with a computer program product including program instructions which, when recorded beforehand in a program memory of an electronic device including said program memory, a processing unit, a data memory, a man-machine output and input interface, and communication means providing a determined mode of communication, said memories, said interface and said communication means cooperating with said processing unit, cause the implementation of a method triggering complementary actions, wherein the program instructions, when executed by the processing unit, cause the processing unit to:

detect reception by the processing unit of an input datum;

search, in the program memory cooperating with the processing unit, for a record including a value of the input datum;

in response to determining that the data memory includes such a record:
request non-distribution of said input datum to an application method of cashing registration for executing an action in response to provision of the input datum, the application method being implemented by the processing unit, and not supporting the cashing peripheral;
cause implementation by the processing unit of a determined complementary action, said determined complementary action including the sending of a command to the cashing peripheral; and
request distribution of said input datum to the application method after execution of the command by the cashing peripheral.

9. An electronic device including a processing unit, a data memory, a program memory, a man-machine output and input interface, and communication means providing a determined mode of communication, said memories, said interface and said communication means cooperating with said processing unit, wherein said electronic device is connected to a cashing peripheral and includes, in the program memory, instructions of a computer program product which, when executed by the processing unit, cause the electronic device to:

detect reception by the processing unit of an input datum;

search, in the program memory cooperating with the processing unit, for a record including a value of the input datum;

in response to determining that the data memory includes such a record:
request non-distribution of said input datum to an application method of cashing registration for executing an action in response to provision of the input datum, the application method being implemented by the processing unit, and not supporting the cashing peripheral;
cause implementation by the processing unit of a determined complementary action, said determined complementary action including the sending of a command to the cashing peripheral; and
request distribution of said input datum to the application method after execution of the command by the cashing peripheral.

* * * * *

UNITED STATES PATENT AND TRADEMARK OFFICE
CERTIFICATE OF CORRECTION

PATENT NO. : 10,762,750 B2
APPLICATION NO. : 15/548937
DATED : September 1, 2020
INVENTOR(S) : Philippe Gervais and Stéphane Vartanian It is certified that error appears in the above-identified patent and that said Letters Patent is hereby corrected as shown below:

On the Title Page

Item (73) Assignee, should read -- ORGANISATION MECANOGRAPHIQUE ET COMPTABLE GERVAIS OMC GERVAIS, Cuers (FR) --.

Signed and Sealed this
Third Day of November, 2020

Andrei Iancu
*Director of the United States Patent and Trademark Office*